(12) United States Patent
Ang (10) Patent No.: US 8,565,957 B2
(45) Date of Patent: Oct. 22, 2013

(54) HYBRID VEHICLE

(75) Inventor: Wanleng Ang, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/574,169

(22) PCT Filed: Feb. 19, 2010

(86) PCT No.: PCT/JP2010/052501
§ 371 (c)(1),
(2), (4) Date: Jul. 19, 2012

(87) PCT Pub. No.: WO2011/101975
PCT Pub. Date: Aug. 25, 2011

(65) Prior Publication Data
US 2012/0303200 A1    Nov. 29, 2012

(51) Int. Cl.
*B60L 11/04* (2006.01)
*B60K 6/20* (2007.10)
(52) U.S. Cl.
USPC ........... 701/22; 701/113; 180/65.21; 903/903
(58) Field of Classification Search
USPC ................ 701/22, 36, 113; 180/65.21, 65.26, 180/65.275; 903/903, 906; 318/139, 143, 318/151–152
See application file for complete search history.

(56) References Cited

U.S. PATENT DOCUMENTS 5,345,761 A * 9/1994 King et al. ................. 60/274
6,131,538 A * 10/2000 Kanai ..................... 123/2
2008/0012512 A1 1/2008 Kawakami et al.
2008/0242463 A1* 10/2008 Yamada et al. ................ 475/5
2010/0109437 A1* 5/2010 Fattic ...................... 307/47
2010/0212981 A1* 8/2010 Roos et al. ........... 180/65.275
2011/0047981 A1* 3/2011 Roos et al. .................. 60/286

FOREIGN PATENT DOCUMENTS

| JP | A-06-101459 | 4/1994 |
| JP | A-2004-192820 | 7/2004 |
| JP | A-2005-160183 | 6/2005 |
| JP | A-2006-197791 | 7/2006 |
| JP | A-2008-014186 | 1/2008 |
| JP | A-2008-043179 | 2/2008 |
| JP | A-2009-171643 | 7/2009 |
| JP | A-2009-274478 | 11/2009 |

OTHER PUBLICATIONS

International Search Report issued in Application No. PCT/JP2010/052501; Dated Apr. 27, 2010 (With Translation).

* cited by examiner

*Primary Examiner* — Mary Cheung
*Assistant Examiner* — Rodney Butler
(74) *Attorney, Agent, or Firm* — Oliff & Berridge, PLC (57) ABSTRACT

A hybrid vehicle includes: a catalytic device configured to be electrically heatable to purify exhaust gas of an internal combustion engine; a main power supply device that supplies the motor drive unit with power supply voltage; a power supply device provided for a catalyst, and receiving electric power from the main power supply device and supplying the catalytic device with electric power to heat the catalytic device; and a control device. The control device has a first control mode and a second control mode more immune to variation of the power supply voltage than the first control mode as modes applied to control the motor drive unit. If electric power supplied to the catalytic device from the power supply device for the catalyst is to be changed, the control device previously controls the motor drive unit in the second control mode.

6 Claims, 9 Drawing Sheets

| CONTROL | PWM CONTROL SYSTEM | | RECTANGULAR WAVE VOLTAGE CONTROL SYSTEM |
|---|---|---|---|
| | SINUSOIDAL PWM | OVERMODULATION PWM | RECTANGULAR WAVE (1 PULSE) |
| WAVEFORM OF VOLTAGE OUTPUT FROM INVERTER | FUNDAMENTAL WAVE | FUNDAMENTAL WAVE | FUNDAMENTAL WAVE |
| MODULATION FACTOR | 0-0.61 | 0.61-0.78 | 0.78 |
| FEATURE | SMALL TORQUE VARIATION | IMPROVED OUTPUT IN MEDIUM SPEED RANGE | IMPROVED OUTPUT IN HIGH SPEED RANGE |

HYBRID VEHICLE

TECHNICAL FIELD

The present invention relates to a hybrid vehicle, and particularly to a hybrid vehicle equipped with a catalytic device which is configured to be electrically heatable and purifies the exhaust gas of the internal combustion engine of the vehicle.

BACKGROUND ART

When an electric vehicle, a hybrid vehicle, a fuel cell powered vehicle or a similar vehicle that uses a motor to drive the vehicle has a control mode switched, it has a torque varied and the vehicle's passenger(s) may feel a physical impact.

Japanese Patent Laying-Open No. 2006-197791 (Patent Literature 1) discloses a motor control device that can reduce a physical impact attributed to increased torque caused when PWM voltage drive is switched to rectangular wave voltage drive.

CITATION LIST

Patent Literature

PTL 1: Japanese Patent Laying-Open No. 2006-197791
PTL 2: Japanese Patent Laying-Open No. 6-101459
PTL 3: Japanese Patent Laying-Open No. 2004-192820

SUMMARY OF INVENTION

Technical Problem

Generally, a vehicle having an internal combustion engine mounted therein is provided with a catalytic device to purify exhaust gas. The catalytic device does not demonstrate its effect unless it is heated to some extent, and accordingly, it is disposed near the internal combustion engine so that it is heated immediately.

However, immediately after the internal combustion engine has just started, i.e., when the catalytic device is still not warm, it cannot purify exhaust gas sufficiently effectively. A hybrid vehicle or a similar vehicle having a motor mounted therein for causing the vehicle to travel has a possibility that it may repeat starting and stopping the internal combustion engine, as required, while it travels. This results in more occasions to start the internal combustion engine while the catalytic device is not warm, and the vehicle may emit exhaust gas containing carbon monoxide, hydrocarbon and the like for increased periods of time.

Accordingly, using electric power to warm the catalytic device before starting the internal combustion engine, is considered. Such a catalytic device is also referred to as an electrical heated catalyst (EHC).

The EHC allows large electric power to be passed through a catalytic device to increase its temperature in a short period of time. This entails a battery outputting large electric power and accordingly, the battery varies in voltage. When the vehicle has a motor drive device in some condition, this voltage variation significantly affects controlling a motor.

The present invention contemplates a hybrid vehicle which employs an electrical heated catalyst to enhance an ability to purify exhaust gas and also reduces/prevents a motor's variation in torque.

Solution to Problem

The present invention in summary provides a hybrid vehicle including: an internal combustion engine; a catalytic device configured to be electrically heatable to purify exhaust gas of the internal combustion engine; a motor for causing the vehicle to travel; a motor drive unit for driving the motor; a main power supply device that supplies the motor drive unit with power supply voltage; a power supply device provided for a catalyst, and receiving electric power from the main power supply device and supplying the catalytic device with electric power to heat the catalytic device; and a control device that controls the motor drive unit and the power supply device for the catalyst. The control device has a first control mode and a second control mode more immune to variation of the power supply voltage than the first control mode as modes applied to control the motor drive unit. If electric power supplied to the catalytic device from the power supply device for the catalyst is to be changed, the control device previously controls the motor drive unit in the second control mode.

Preferably, the motor drive unit includes an inverter for driving the motor, and a voltage converter provided between the main power supply device and the inverter. The first control mode includes a mode to control the voltage converter to provide the power supply voltage of the main power supply device, as it is, to the inverter. The second control mode includes a mode to control the voltage converter to convert in voltage the power supply voltage of the main power supply device and provide the converted power supply voltage to the inverter.

More preferably, the voltage converter includes a reactor having one end connected to a positive electrode of the main power supply device, and a switching element provided between the other end of the reactor and a power supply node of the inverter. The control device in the first control mode fixes the switching element in an electrically conducting state and in the second control mode switches the switching element.

More preferably, if the first control mode is currently applied and concurrently a request is received to heat the catalytic device, the control device shifts a current mode of operation of the motor drive unit from the first control mode to the second control mode, and subsequently starts supplying electric power from the power supply device for the catalyst to the catalytic device.

Furthermore preferably, if the request to heat the catalytic device is no longer present, and the second control mode is currently applied, then, the control device ceases supplying electric power from the power supply device for the catalyst to the catalytic device, and subsequently shifts the mode of operation of the motor drive unit from the second control mode back to the first control mode.

More preferably, if the first control mode is currently applied and concurrently a request is received to heat the catalytic device, the control device temporarily shifts a current mode of operation of the motor drive unit from the first control mode to the second control mode, and subsequently starts supplying electric power from the power supply device for the catalyst to the catalytic device.

Furthermore preferably, if the request to heat the catalytic device is no longer present, and the first control mode is currently applied, then, the control device temporarily shifts the current mode of operation of the motor drive unit from the first control mode to the second control mode, and subsequently ceases supplying electric power from the power supply device for the catalyst to the catalytic device.

Preferably, the motor drive unit includes an inverter for driving the motor, and a voltage converter provided between the main power supply device and the inverter. The first control mode includes a mode to apply one of rectangular wave control and overmodulation control to the inverter. The second control mode includes a mode to apply sinusoidal pulse width modulation control to the inverter.

Advantageous Effects of Invention

The present invention can thus establish both using an electrical heated catalyst to enhance an ability to purify exhaust gas and also reducing/preventing a motor's variation in torque.

DESCRIPTION OF EMBODIMENTS

Hereinafter reference will be made to the drawings to describe the present invention in embodiments. In the figures, identical or corresponding components are identically denoted and will not be described repeatedly in detail.

First Embodiment

Figure 1:
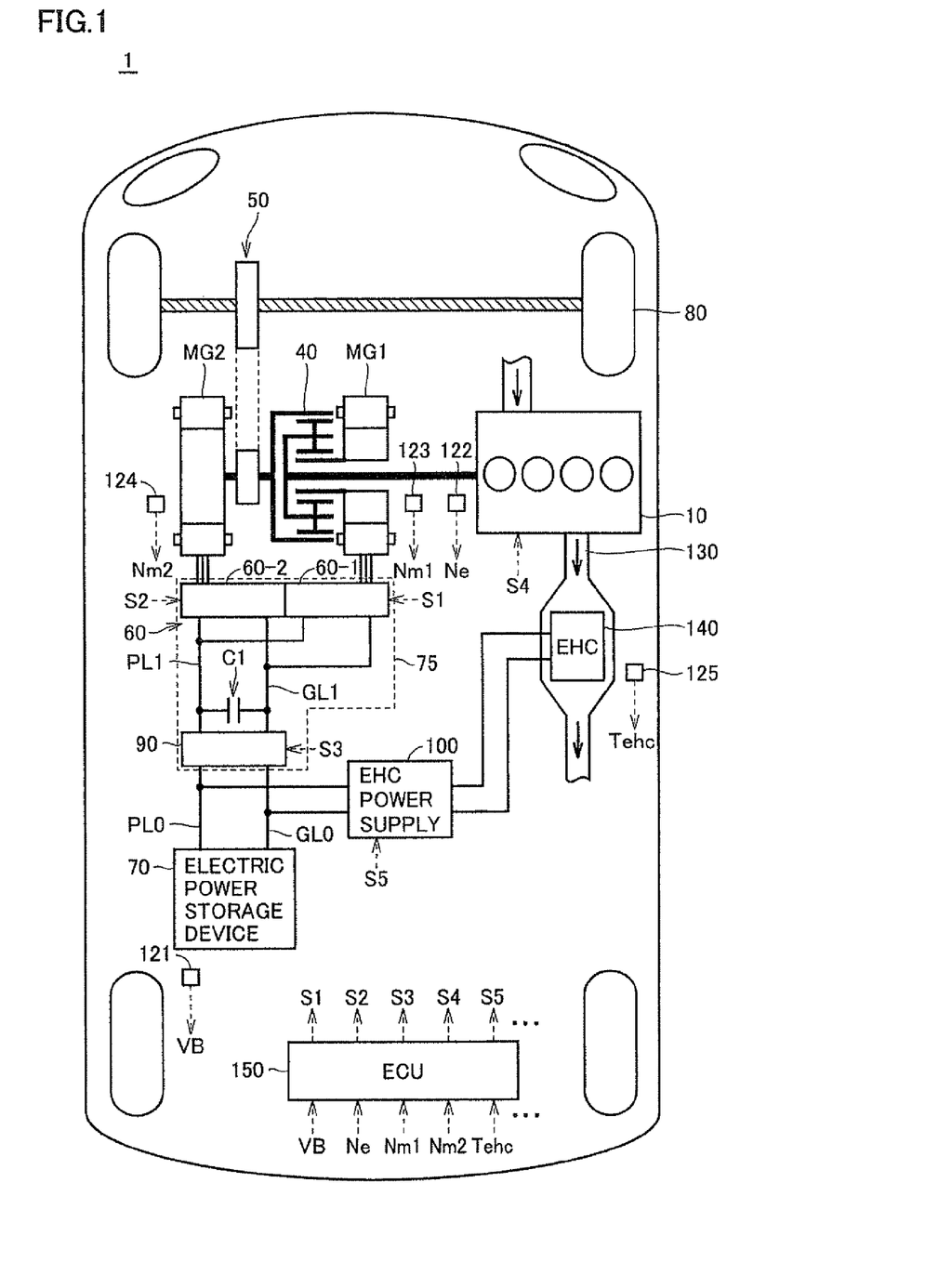
FIG. 1 is a general block diagram of a hybrid vehicle according to a first embodiment.

FIG. 1 is a general block diagram of a hybrid vehicle according to a first embodiment.

With reference to FIG. 1, a hybrid vehicle 1 includes an engine 10, a motor generator MG1, a motor generator MG2, a power split device 40, a speed reducer 50, and a driving wheel 80.

Engine 10 is an internal combustion engine which generates driving power rotating a crankshaft with combustion energy produced when a mixture of air introduced into a combustion chamber and fuel is burnt.

Motor generator MG1 and motor generator MG2 are alternating current motors, and they are for example three-phase alternating-current synchronous motors.

Hybrid vehicle 1 travels with driving power output from at least one of engine 10 and motor generator MG2. The driving power generated by engine 10 is divided into two paths by power split device 40. That is, one is a path transmitting driving power to driving wheel 80 via speed reducer 50, and the other is a path transmitting driving power to motor generator MG1.

Power split device 40 includes a planetary gear configured of a sun gear, a pinion gear, a carrier, and a ring gear. The pinion gear engages with the sun gear and the ring gear. The carrier supports the pinion gear rotatably and is also coupled with the crankshaft of engine 10. The sun gear is coupled with the rotation shaft of motor generator MG1. The ring gear is coupled with the rotation shaft of motor generator MG2, and speed reducer 50.

Engine 10, motor generator MG1 and motor generator MG2, coupled with one another via power split device 40, rotate at rates having a relationship connected by a straight line in a nomographic chart.

Hybrid vehicle 1 further includes a motor drive unit 75. Motor drive unit 75 includes an inverter 60, a smoothing capacitor C1, a voltage converter 90, and an electric power storage device 70.

Inverter 60 controls driving motor generator MG1 and motor generator MG2. Motor generator MG1 generates electric power by using the motive power of engine 10 divided by power split device 40. The electric power generated by motor generator MG1 is converted from an alternating current to a direct current by inverter 60, and stored to electric power storage device 70.

Motor generator MG2 generates driving power by using at least one of the electric power stored in electric power storage device 70 and the electric power generated by motor generator MG1. The driving power of motor generator MG2 is transmitted to driving wheel 80 via speed reducer 50. Note that while FIG. 1 shows driving wheel 80 as a front wheel, a rear wheel in place of or together with the front wheel may be driven by motor generator MG2.

Note that when the vehicle is braked, motor generator MG2 is driven by driving wheel 80 via speed reducer 50, and motor generator MG2 operates as an electric power generator. Thus, motor generator MG2 also functions as a regeneration brake converting the vehicle's kinetic energy to electric power. The electric power generated by motor generator MG2 is stored to electric power storage device 70.

Inverter 60 includes an inverter 60-1 and an inverter 60-2. Inverter 60-1 and inverter 60-2 are connected to voltage converter 90 in parallel.

Inverter 60-1 is provided between voltage converter 90 and motor generator MG1. Inverter 60-1 operates in response to a control signal S1 received from an electronic control unit (ECU) 150 to control driving motor generator MG1.

Inverter 60-2 is provided between voltage converter 90 and motor generator MG2. Inverter 60-2 operates in response to a control signal S2 received from ECU 150 to control driving motor generator MG2.

Voltage converter 90 performs voltage conversion between electric power storage device 70 and inverter 60. Voltage converter 90 boosts the voltage of electric power storage device 70 (more precisely, a voltage between a power supply line PL0 and a ground line GL0) to attain a target voltage value indicated by a control signal S3 issued from ECU 150. Thus, the voltage of power supply line PL1 and ground line GL0 (hereinafter also referred to as "direct current voltage VH associated with high voltage" or simply "voltage VH") is controlled to attain the target voltage value indicated by control signal S3.

Smoothing capacitor C1 is connected between power supply line PL1 and ground line GL1. Smoothing capacitor C1 smoothes direct current voltage V11 associated with high voltage.

Engine 10 emits exhaust gas which is in turn passed through an exhaust path 130 and discharged into the air. Exhaust path 130 has an intermediate portion provided with an electrical heated catalyst (EHC) 140.

EHC 140 is configured to electrically heat a catalyst, which purifies exhaust gas. EHC 140 is connected to an EHC power supply 100 to receive electric power therefrom to heat the catalyst. Note that various known EHCs are applicable to EHC 140.

EHC power supply 100 is provided between EHC 140 and electric power storage device 70. EHC power supply 100 is connected to electric power storage device 70 in parallel with voltage converter 90. EHC power supply 100 operates in response to a control signal S5 received from ECU 150 to adjust electric power supplied from electric power storage device 70 to EHC 140. For example, when EHC 140 has a temperature Tehc lower than a prescribed temperature and has purification power lower than a target level, ECU 150 controls EHC power supply 100 to supply electric power from electric power storage device 70 to EHC 140. Thus, EHC 140 is driven and has its catalyst heated, and can thus exhibit enhanced purification power.

Furthermore, hybrid vehicle 1 further includes a voltage sensor 121, rotational speed sensors 122, 123, 124, and a temperature sensor 125.

Voltage sensor 121 senses voltage VB of electric power storage device 70. Rotational speed sensors 122, 123, 124 sense rotational speed Ne of engine 10, rotational speed Nm1 of motor generator MG1, and rotational speed Nm2 of motor generator MG2, respectively. Temperature sensor 125 senses temperature Tele of EHC 140. These sensors transmit sensed results to ECU 150.

ECU 150 is configured to incorporate a central processing unit (CPU) and memory (not shown) therein and operate in accordance with a map and a program stored in the memory to perform a predetermined operation process. Alternatively, ECU 150 may be configured to have at least a portion configured to perform a predetermined numerical/logical operation process by an electronic circuit or similar hardware.

ECU 150 operates in accordance with the information of each sensor and the like to generate control signals S1-S5 described above, and outputs the generated control signals S1-S5 to each component. For example, ECU 150 operates in accordance with the information of each sensor and the like to set a torque command value Tgcom for motor generator MG1 and a torque command value Tmcom for motor generator MG2, and generates control signal S1 causing a torque Tg of motor generator MG1 to match torque command value Tgcom and control signal S2 causing a torque Tm of motor generator MG2 to match torque command value Tmcom and outputs control signals S1 and S2 to inverter 60-1 and inverter 60-2, respectively. Furthermore, ECU 150 sets a command value for an amount of fuel injected for engine 10 in accordance with the information of each sensor and the like, generates control signal S4 causing an amount of fuel actually injected for engine 10 to match the command value, and outputs the signal to engine 10.

Figure 2:
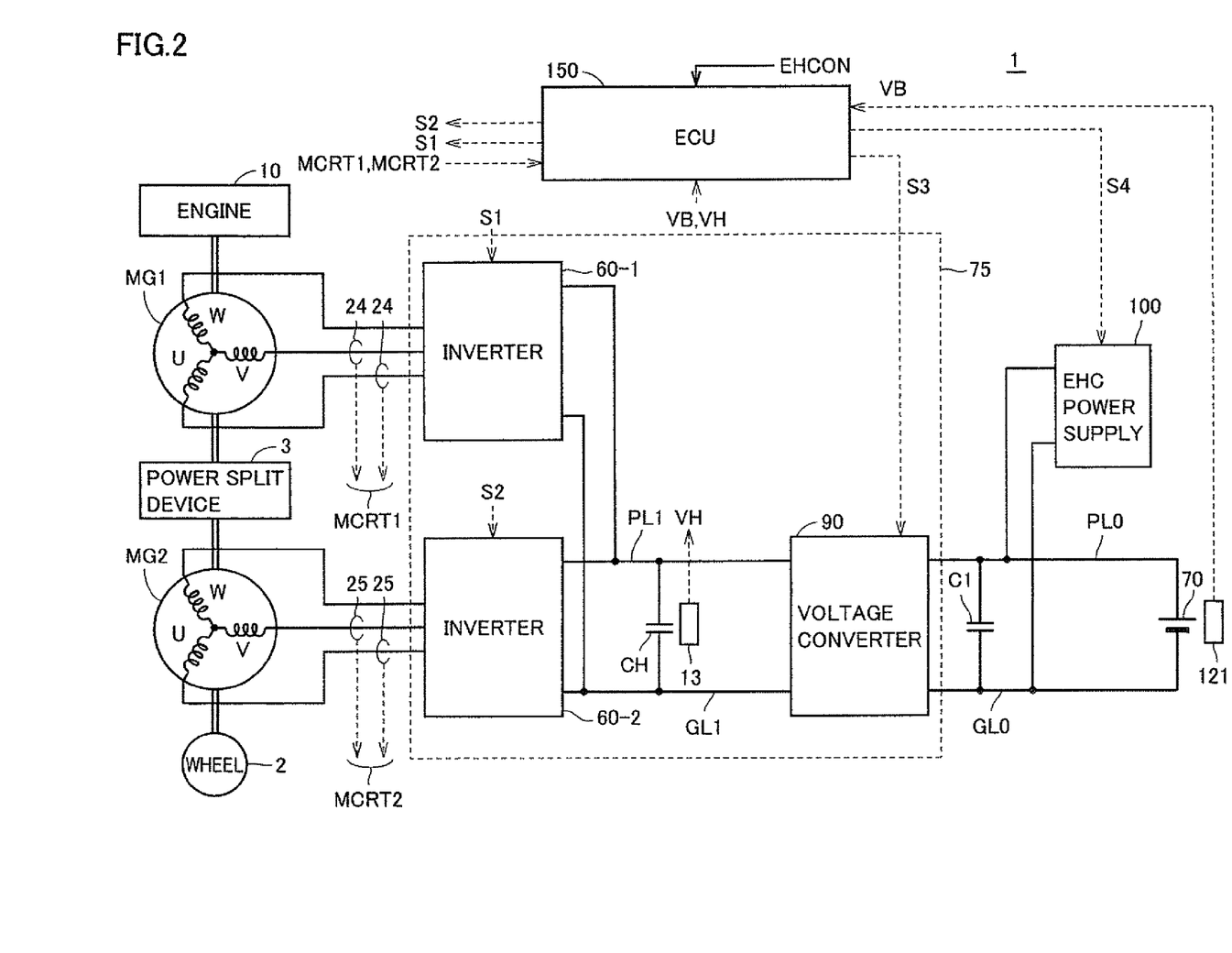
FIG. 2 is a circuit diagram for more specifically illustrating a circuit configuration of a vehicle 1.

FIG. 2 is a circuit diagram for more specifically illustrating a circuit configuration of vehicle 1.

With reference to FIG. 2, vehicle 1 includes electric power storage device 70 serving as a main power supply device, motor drive unit 75, smoothing capacitor C1, voltage sensor 121, engine 10, motor generators MG1 and MG2, power split device 40, a wheel 2, EHC power supply 100, and ECU 150.

Motor drive unit 75 includes voltage converter 90, a smoothing capacitor CH, inverters 60-1 and 60-2, and a voltage sensor 13.

Smoothing capacitor C1 is connected between power supply line PL0 and ground line GL0. Voltage converter 90 boosts voltage across smoothing capacitor C1.

Smoothing capacitor CH smoothes the voltage boosted by voltage converter 90. Voltage sensor 13 senses voltage VH across smoothing capacitor CH and outputs it to ECU 150.

Inverter 60-1 receives direct current voltage from voltage converter 90 and converts it into a 3-phase alternate current voltage, and outputs it to motor generator MG1. Inverter 60-2 receives direct current voltage from voltage converter 90 and converts it into a 3-phase alternate current voltage, and outputs it to motor generator MG2.

Power split device 40 is coupled to engine 10 and motor generators MG1 and MG2 to split motive power therebetween. For example, a planetary gear mechanism including three rotation shafts of a sun gear, a planetary carrier, and a ring gear may be employed as the power split device. In the planetary gear mechanism, when the rotations of two of the three rotation shafts are determined, the rotation of the remaining one rotation shaft is inherently determined. These three rotation shafts are connected to each rotation shaft of engine 10, motor generator MG1, and motor generator MG2, respectively. The rotation shaft of motor generator MG2 is coupled to wheel 2 by means of a reduction gear and/or differential gear (not shown). Further, a reduction gear for the rotation shaft of motor generator MG2 may be additionally incorporated in power split device 40.

Voltage sensor 121 measures voltage VB across electric power storage device 70. Although not shown, a current sensor sensing the current flowing to electric power storage device 70 is provided to monitor the state of charge of electric power storage device 70, together with voltage sensor 121. For electric power storage device 70, a secondary battery such as a lead battery, a nickel metal hydride battery, and a lithium ion battery, or a capacitor of large capacitance such as an electrical double layer capacitor may be employed.

Ground line GL1 is connected to ground line GL0 in voltage converter 90, as will be described later.

Inverter 60-1 is connected to power supply line PL1 and ground line GL1. Inverter 60-1 receives the boosted voltage from voltage converter 90 to drive motor generator MG1 for the purpose of for example, starting engine 10. Further, inverter 60-1 returns to voltage converter 90 the electric power generated at motor generator MG1 by the motive power transmitted from engine 10. At this stage, voltage converter 90 is controlled by ECU 150 to function as a buck boost circuit.

Current sensor 24 senses the current flowing to motor generator MG1 as a motor current value MCRT1, which is provided to ECU 150.

Inverter 60-2 is connected to power supply line PL1 and ground line GL1, parallel with inverter 60-1. Inverter 60-2 converts direct current voltage output from voltage converter 90 into a 3-phase alternate current voltage, which is provided to motor generator MG2 that drives wheel 2. Inverter 60-2 also returns the electric power generated at motor generator MG2 to voltage converter 90 in accordance with regenerative braking. At this stage, voltage converter 90 is controlled by ECU 150 to function as a buck boost circuit.

Current sensor 25 senses the current flowing to motor generator MG2 as a motor current value MCRT2. Motor current value MCRT2 is output to ECU 150.

ECU 150 receives a torque command value and rotation speed of each of motor generators MG1 and MG2, each value of voltages VB, VL and VH, motor current values MCRT1, MCRT2, and an EHC activation signal EHCON.

Furthermore, ECU 150 outputs control signals S1, S2. Control signal S1 is a control signal to issue a driving instruction to inverter 60-1 to convert direct current voltage that is the output from voltage converter 90 into alternate current voltage for driving motor generator MG1, and to issue a regenerative instruction for converting the alternate current voltage generated at motor generator MG1 into a direct current voltage to be returned towards voltage converter 90.

Similarly, control signal S2 is a control signal to issue a driving instruction to inverter 60-2 to convert direct current voltage into alternate current voltage for driving motor generator MG2, and to issue a regenerative instruction for converting the alternate current voltage generated at motor generator MG2 into a direct current voltage to be returned towards voltage converter 90.

Figure 3:
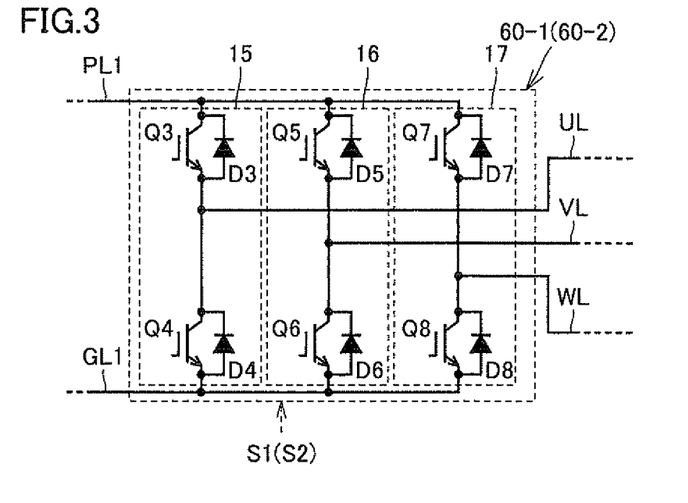
FIG. 3 is a circuit diagram specifically showing a configuration of inverters 60-1 and 60-2 shown in FIG. 2.

FIG. 3 is a circuit diagram representing a detailed configuration of inverters 60-1 and 60-2 of FIG. 2.

Referring to FIGS. 2 and 3, inverter 60-1 includes a U-phase arm 15, a V-phase arm 16, and a W-phase arm 17. U-phase arm 15, V-phase arm 16, and W-phase arm 17 are connected in parallel between power supply line PL1 and ground line GL1.

U-phase arm 15 includes IGBT elements Q3 and Q4 connected in series between power supply line PL1 and ground line GL1, and diodes D3 and D4 connected in parallel with IGBT elements Q3 and Q4, respectively. Diode D3 has its cathode connected to the collector of IGBT element Q3, and its anode connected to the emitter of IGBT element Q3. Diode D4 has its cathode connected to the collector of IGBT element Q4, and its anode connected to the emitter of IGBT element Q4.

V-phase arm 16 includes IGBT elements Q5 and Q6 connected in series between power supply line PL1 and ground line GL1, and diodes D5 and D6 connected in parallel with IGBT elements Q5 and Q6, respectively. Diode D5 has its cathode connected to the collector of IGBT element Q5, and its anode connected to the emitter of IGBT element Q5. Diode D6 has its cathode connected to the collector of IGBT element Q6, and its anode connected to the emitter of IGBT element Q6.

W-phase arm 17 includes IGBT elements Q7 and Q8 connected in series between power supply line PL1 and ground line GL1, and diodes D7 and D8 connected in parallel with IGBT elements Q7 and Q8, respectively. Diode D7 has its cathode connected to the collector of IGBT element Q7, and its anode connected to the emitter of IGBT element Q7. Diode D8 has its cathode connected to the collector of IGBT element Q8, and its anode connected to the emitter of IGBT element Q8.

Each phase arm has an intermediate point connected to a phase end of a phase coil of motor generator MG1. Specifically, motor generator MG1 is a 3-phase permanent magnet synchronous motor. The three coils of the U, V and W-phases have each one end connected together to the neutral point. The other end of the U-phase coil is connected to a line UL drawn out from the connection node of IGBT elements Q3 and Q4. The other end of the V-phase coil is connected to a line VL drawn out from the connection node of IGBT elements Q5 and Q6. The other end of the W-phase coil is connected to a line WL drawn out from the connection node of IGBT elements Q7 and Q8.

IGBT elements Q4-Q8 are turned on/off as controlled in response to control signal S1 issued from ECU 150 shown in FIG. 2.

Inverter 60-2 of FIG. 2 is similar to inverter 60-1 as to the internal circuit configuration, except that the former is connected to motor generator MG2. Therefore, detailed description thereof will not be repeated. Furthermore, while FIG. 3 shows the inverter receiving control signal S1, inverter 60-2 receives control signal S2 rather than S1.

Figure 4:
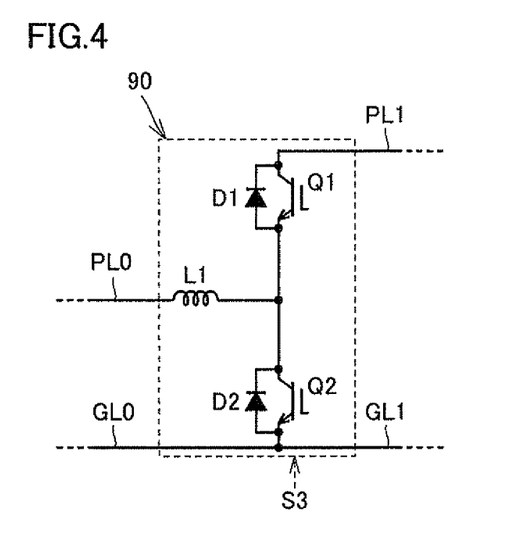
FIG. 4 is a circuit diagram specifically showing a configuration of a voltage converter 90 shown in FIG. 2.

FIG. 4 is a circuit diagram representing a detailed configuration of voltage converter 90 of FIG. 2.

Referring to FIGS. 2 and 4, voltage converter 90 includes a reactor L1 having one end connected to power supply line PL0, IGBT elements Q1 and Q2 connected in series between power supply line PL1 and ground line GL1, and diodes D1 and D2 connected in parallel with IGBT elements Q1 and Q2, respectively. Ground line GL1 and ground line GL0 are connected in voltage converter 90.

Reactor L1 has the other end connected to the emitter of IGBT element Q1 and the collector of IGBT element Q2. Diode D1 has its cathode connected to the collector of IGBT element Q1 and its anode connected to the emitter of IGBT element Q1. Diode D2 has its cathode connected to the collector of IGBT element Q2 and its anode connected to the emitter of IGBT element Q2.

The FIG. 2 ECU 150 issues control signal S3 to control turning on/off IGBT elements Q1, Q2.

Figure 5:
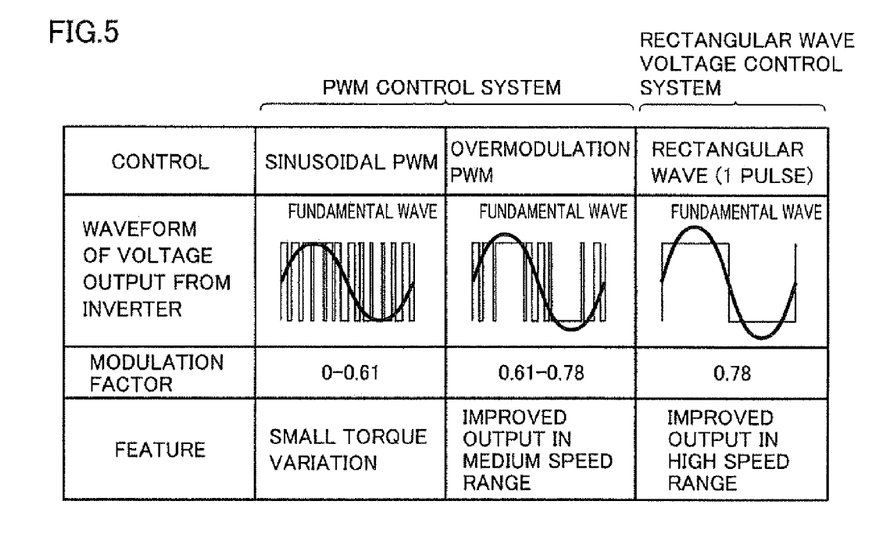
FIG. 5 illustrates a control system used in a motor drive system according to an embodiment of the present invention.

FIG. 5 illustrates a control system used in a motor drive system according to an embodiment of the present invention.

As shown in FIG. 5, motor drive unit 75 allows three control modes to be switched and thus used for voltage conversion in inverters 60-1 and 60-2. Specifically, the three control modes are a sinusoidal PWM control mode, an overmodulation PWM control mode, and a rectangular wave voltage control mode.

Sinusoidal PWM control is used as a typical PWM control system, and controls each phase arm's switching elements to turn on/off according to a comparison in voltage between a sinusoidal voltage command value and a carrier wave (representatively, a triangular wave). As a result, the switching elements are turned on/off at a duty ratio controlled so that a set of a high level period corresponding to an on period of an upper arm element and a low level period corresponding to an on period of a lower arm element has its fundamental wave component sinusoidally within a determined period. As is well known, when sinusoidal PWM control is applied, this fundamental wave component can only be increased in amplitude up to 0.61 times a voltage input to an inverter.

In contrast, when rectangular wave voltage control is applied, a rectangular wave allowing the high level period and the low level period to have a ratio of 1:1, which corresponds to a PWM duty held at a maximum value, within the determined period, is applied by one pulse to an alternate current motor. This provides a modulation factor increased to 0.78.

Overmodulation PWM control distorts and thus reduces a carrier wave in amplitude, and in that condition, applies PWM control similar to the above described sinusoidal PWM control. As a result, the fundamental wave component can be distorted to provide a modulation factor increased to a range of 0.61-0.78.

When motor generator MG1, MG2 has increased rotational speed, outputs increased torque, or the like, its induced voltage is increased and it requires increased voltage. Voltage converter 90 provides boosted voltage, or system voltage VH, which is required to be set to be higher than the voltage that the motors require (or their induced voltage). On the other hand, the boosted voltage provided by voltage converter 90, i.e., the system voltage, has a limit value (or VH's maximum voltage).

Accordingly, when the voltage that the motors require (or their induced voltage) falls within a range smaller than the system voltage's maximum value (or VH's maximum voltage), a PWM control system is applied by sinusoidal PWM control or overmodulation PWM control to allow the motors to have a torque controlled based on a torque command value by controlling their currents in accordance with vector control.

Once the voltage that the motors require (or their induced voltage) has reached the system voltage's maximum value (or VH's maximum voltage), then, system voltage VH is held and, in that condition, a rectangular wave voltage control system is applied as a type of field weakening control. When rectangular wave voltage control is applied, the fundamental wave component is fixed in amplitude, and accordingly, the motors have a torque controlled by rectangular wave pulse voltage phase control based on a deviation of an actual torque value from the torque command value as obtained from electric power calculation.

Figure 6:
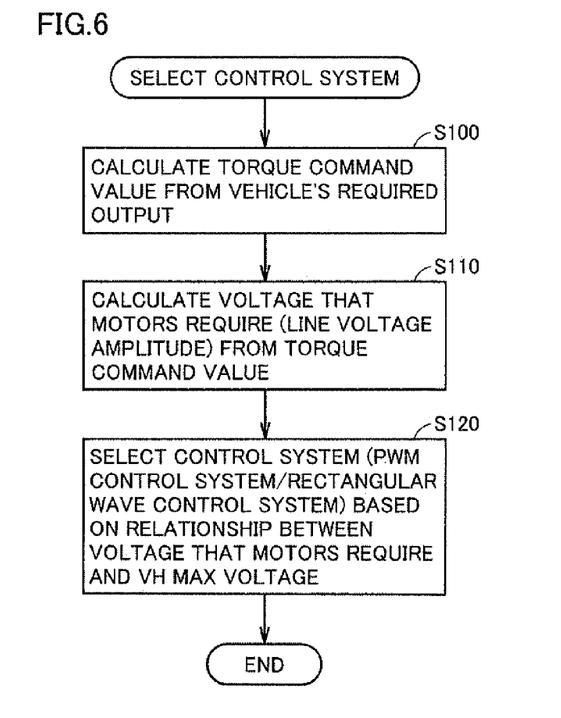
FIG. 6 is a flowchart for illustrating a technique employed to select a control system.

FIG. 6 is a flowchart for illustrating a technique employed to select a control system.

As shown in the FIG. 6 flowchart, an upper ECU (not shown) calculates a torque command value for motor generators MG1 and MG2 from the vehicle's required power in accordance with the accelerator pedal's position or the like (Step S100), and in response, ECU 150 refers to a previously set map or the like to calculate voltage that the motors require (or their induced voltage) from the torque command value for motor generators MG1 and MG2 and their rotational speeds (Step S110), and furthermore, in accordance with a relationship between the voltage that the motors require and the system voltage's maximum value (or VH's maximum voltage), it is determined which one of the rectangular wave voltage control system and the PWM control system (the sinusoidal PWM control system/the overmodulation PWM control system) should be applied to control the motors (Step S120). In applying the PWM control system, which one of the sinusoidal PWM control system and the overmodulation PWM control system should be used is determined depending on a range of a modulation factor of a voltage command value in accordance with vector control. In accordance with the above control flow, a proper control system is selected from the plurality of control systems shown in FIG. 5 in accordance with an operating condition of motor generators MG1 and MG2.

Figure 7:
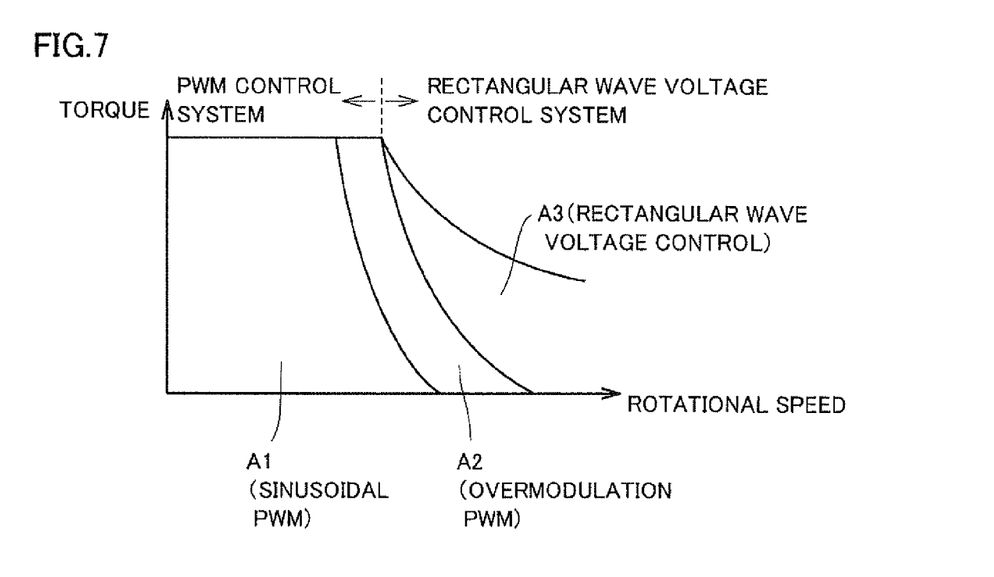
FIG. 7 is a diagram for illustrating switching a control system to correspond to a condition of a motor.

FIG. 7 is a diagram for illustrating switching a control system to correspond to a condition of a motor.

As a result of selecting a control system, as shown in FIG. 7, for a low rotational speed range A1, sinusoidal PWM control is applied to reduce torque variation, for a moderate rotational speed range A2, overmodulation PWM control is applied, and for a high rotational speed range A3, rectangular wave voltage control is applied. In particular, applying overmodulation PWM control and rectangular wave voltage control allows motor generators MG1 and MG2 to provide improved output. Thus, which one of the FIG. 5 control modes should be applied is determined within a range of a modulation factor that can be implemented.

Figure 8:
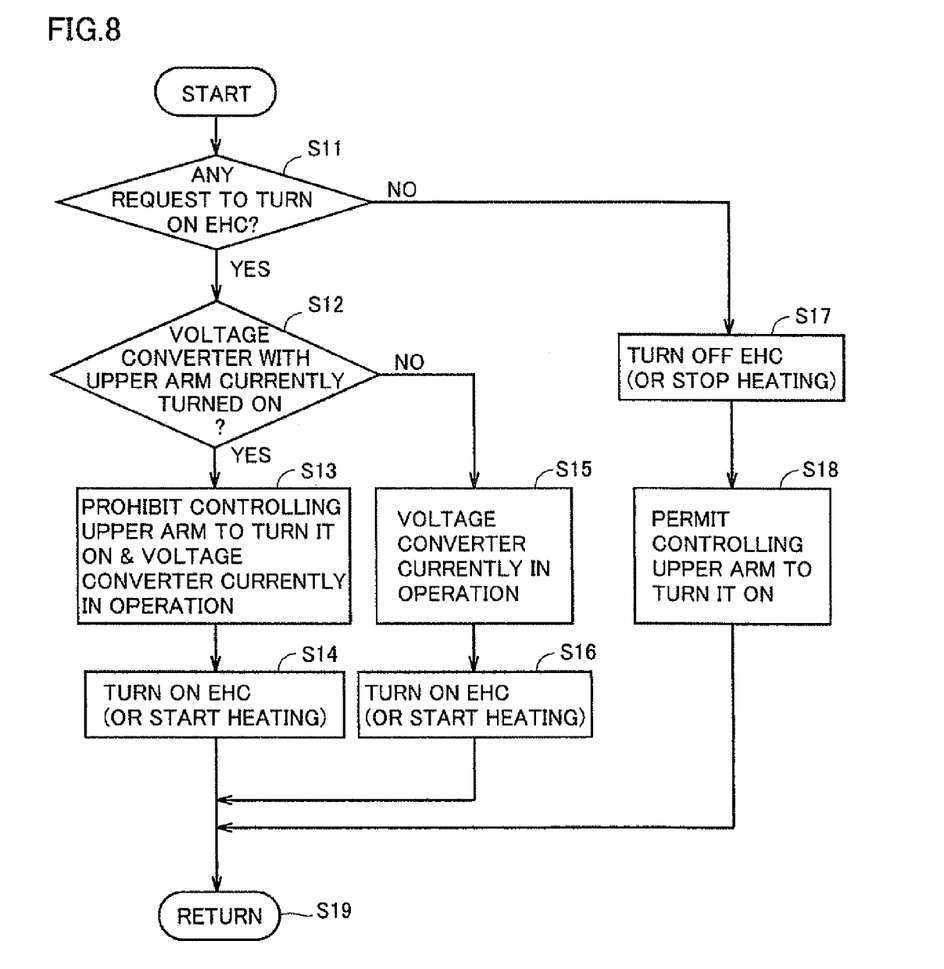
FIG. 8 is a flowchart for illustrating a control applied by an ECU 150 of FIG. 2.

FIG. 8 is a flowchart for illustrating a control applied by the FIG. 2 ECU 150. This flowchart represents a process invoked from a predetermined main routine and performed whenever a determined period of time elapses or a predetermined condition is established.

With reference to FIG. 2 and FIG. 8, the process starts, and in Step S11, ECU 150 determines from signal EHCON whether there is any request to turn on the EHC.

If in Step S11 it is determined that there is a request to turn on the EHC, the control proceeds to Step S12. In Step S12, it is determined whether voltage converter 90 has its upper arm currently controlled to have an on state.

Controlling the upper arm to have the on state means fixing the FIG. 4 IGBT elements Q1 and Q2 in on and off states, respectively. This connects power supply line PL0 and power supply line PL1 together. At the time, voltage converter 90 does not perform a boosting/buck boosting operation. Accordingly, VH=VB. When it is unnecessary to boost voltage, controlling the upper arm to have the on state can eliminate the IGBT elements' switching loss.

However, turning on/off the EHC varies voltage VB on power supply line PL0, and doing this while the upper atm is controlled to have the on state would also similarly vary voltage VH on power supply line PL1 connected to inverters 60-1 and 60-2. This may invites a possibility that the motors may vary in torque.

Accordingly, if it is determined in Step S12 that the upper arm is currently controlled to have the on state, the control proceeds to Step S13 to prohibit controlling the upper arm to have the on state, and operate voltage converter 90. This stabilizes voltage VH at a target value. Thereafter in Step S14 EHC power supply 100 is activated to supply the EHC with electric power.

In contrast, if it is determined in Step S12 that the upper arm is currently not controlled to have the on state, then, as indicated in Step S15, voltage converter 90 is currently operated. Thus, voltage VH is stabilized by voltage converter 90, and in this condition the control proceeds to Step S16 to activate EHC power supply 100 to supply the EHC with electric power.

If in Step S11 it is determined that there is no request to turn on the EHC, the control proceeds to Step S17. In Step S17 the operation of EHC power supply 100 is ceased to cease supplying the EHC with electric power. Note that when a state is changed from a request to turn on the EHC to no request to do so, voltage converter 90 still continues to operate, since in the previous cycle at Step S13 or Step S15 voltage converter 90 was in operation. Accordingly, while having ceased supplying the EHC with electric power is accompanied by variation of voltage VB, its influence on voltage VH is also reduced by voltage converter 90. Then, in Step S18, controlling the voltage converter 90 upper arm to have the on state is permitted.

Once any of Steps S14, S16 and S18 has completed, the control proceeds to Step S19 to shift to the main routine.

Figure 9:
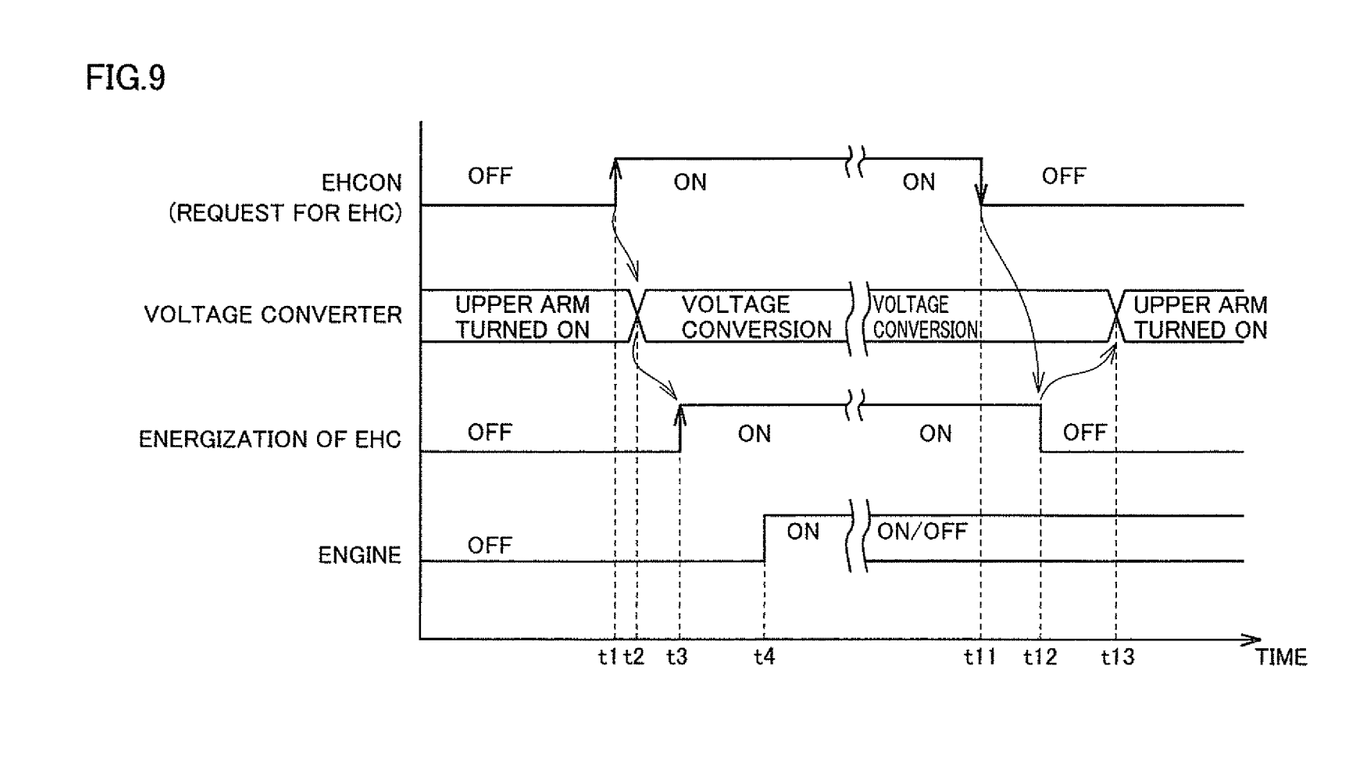
FIG. 9 is a waveform diagram showing an example of how the vehicle's state varies as it transitions as controlled, as described in the first embodiment.

FIG. 9 is a waveform diagram showing an example of how the vehicle's state varies as it transitions as controlled, as described in the first embodiment.

With reference to FIG. 9, initially, before time t1, control is applied so that signal EHCON (indicating a request to activate the EHC) is turned off, voltage converter 90 has the upper arm controlled to have the on state, the EHC is not energized, and the engine is also turned off.

At time t1, signal EHCON having been turned off is turned on, and at time t2, in response thereto, controlling the voltage converter 90 upper arm to have the on state is prohibited, and voltage converter 90 assumes a state to perform voltage conversion. Thereafter at time t3 the EHC is energized to heat the catalytic device.

Then the engine starts at time t4. At the time, the catalyst is sufficiently heated and exhibits its catalytic function normally.

After time t11, signal EHCON having been turned on is turned off. At time t11, the engine may be in operation or stopped. If the engine is stopped, it does not emit exhaust gas, and accordingly, there is no necessity of heating the catalyst, and signal EHCON is also turned off. If the engine is in operation, and its exhaust gas provides exhaust heat allowing the catalyst's temperature to be maintained, signal EHCON is turned off.

At time t11, signal EHCON having been turned on is turned off, and in response thereto, initially at time t12, energizing the EHC is ceased. At the time, voltage converter 90 is performing voltage conversion, and thus serves to reduce/prevent variation of voltage VH.

Thereafter, at time t13, controlling the voltage converter 90 upper arm to have the on state is permitted and actually applied depending on the vehicle's current state.

As described above, when activating the EHC is started or ceased, voltage converter 90 is controlled to currently provide voltage conversion and stabilize voltage VH and hence reduce/prevent variation in torque of motor generators MG1 and MG2.

First Embodiment in Exemplary Variation

Figure 10:
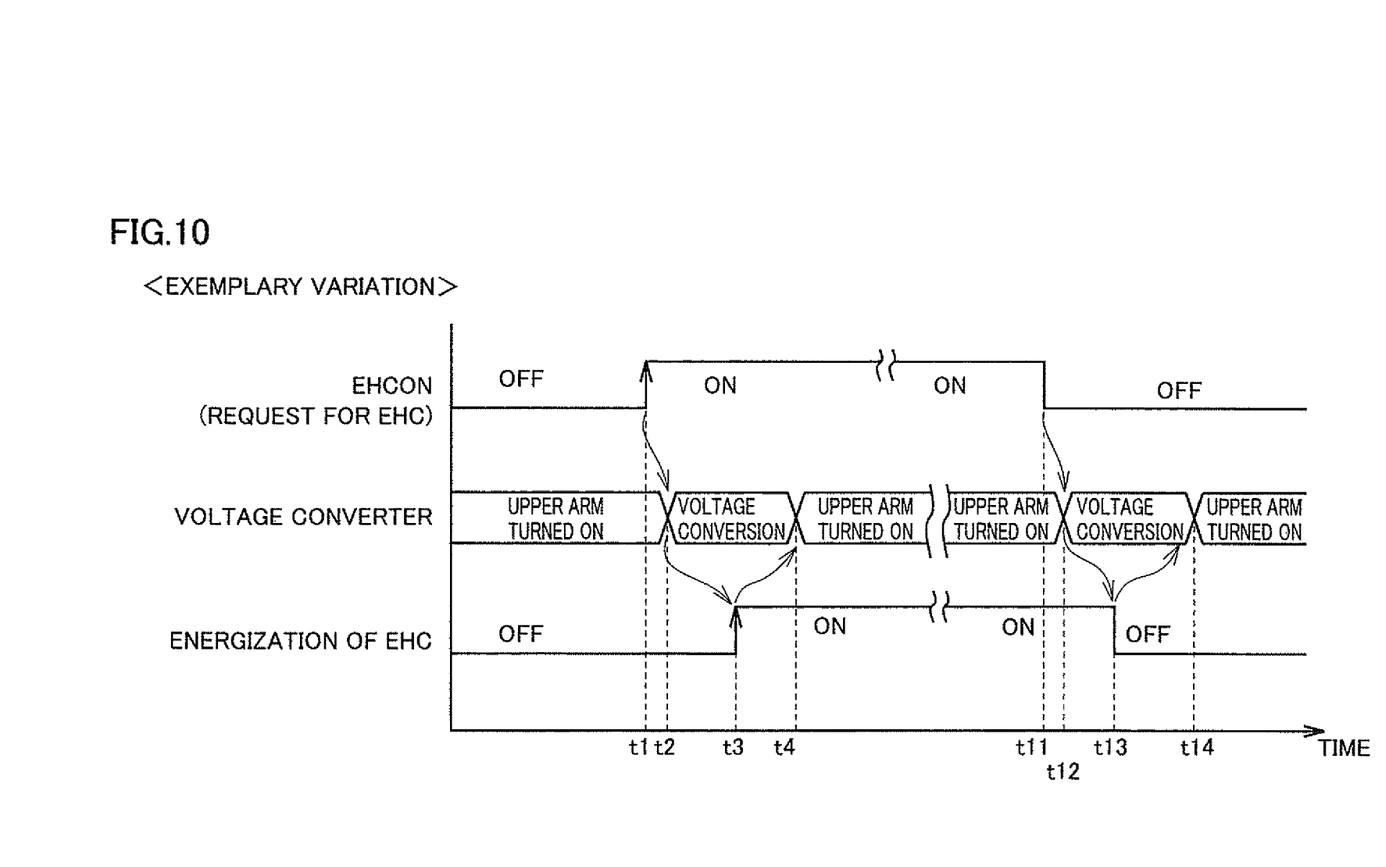
FIG. 10 is an operation waveform diagram for illustrating an operation in the first embodiment in an exemplary variation.

FIG. 10 is an operation waveform diagram for illustrating an operation in the first embodiment in an exemplary variation.

As shown in FIG. 10, in this exemplary variation, the operation of voltage converter 90 is temporarily changed from a state with the upper arm turned on to a state with voltage conversion, and activating the EHC is then started or ceased.

Initially, before time t1, control is applied so that signal EHCON (indicating a request to activate the EHC) is turned off, voltage converter 90 has the upper arm controlled to have the on state, and the EHC is not energized.

At time t1, signal EHCON having been turned off is turned on, and at time t2, in response thereto, controlling the voltage converter 90 upper arm to have the on state is temporarily prohibited, and voltage converter 90 assumes a state to perform voltage conversion. Thereafter at time t3 the EHC is energized to heat the catalytic device. The operations up to time t3 are the same as described with reference to FIG. 9.

Thereafter, at time t4, temporarily prohibiting controlling the voltage converter 90 upper arm to have the on state is again ceased, and after time t4 voltage converter 90 is controlled to have the upper arm turned on. Thus when the largest voltage variation arises, i.e., when the EHC's state varies, voltage converter 90 allows voltage VH to be stabilized. Thereafter, when the EHC is currently energized, the upper arm can again be controlled to have the on state to allow voltage converter 90 to have a limited switching loss.

Furthermore, at time t11, signal EHCON having been turned on is turned off, and in response thereto, initially at time t12, controlling the voltage converter 90 upper arm to have the on state is temporarily prohibited, and voltage converter 90 assumes a state to perform voltage conversion. Thereafter, at time t13, energizing the EHC is ceased.

Thereafter, at time t14, controlling the voltage converter 90 upper arm to have the on state is permitted and actually applied depending on the vehicle's current state.

Temporarily operating voltage converter 90 when the EHC having been energized is no longer energized or vice versa can also reduce/prevent variation in torque attributed to that in voltage VH.

Second Embodiment

Figure 11:
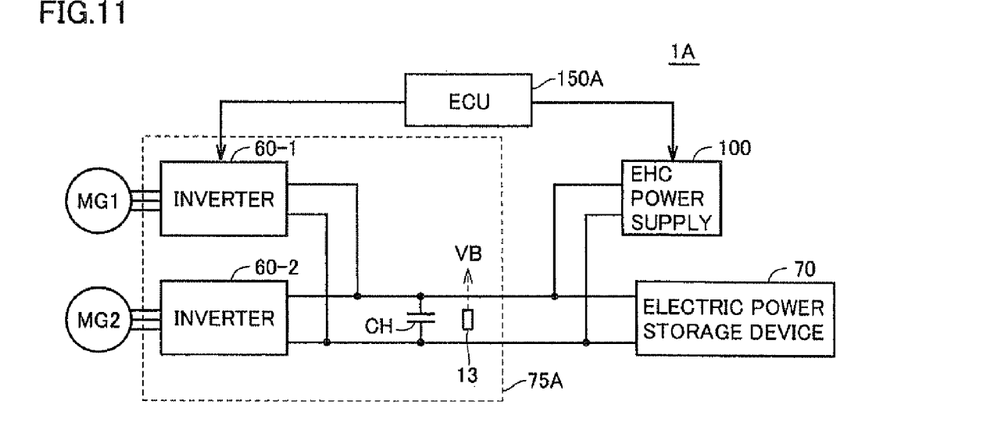
FIG. 11 is a diagram showing a configuration of a hybrid vehicle 1A in a second embodiment.

FIG. 11 is a diagram showing a configuration of a hybrid vehicle 1A in a second embodiment.

When the FIG. 11 hybrid vehicle 1A is compared in configuration with hybrid vehicle 1 described with reference to FIG. 2, the former is significantly different from the latter in that the former does not have voltage converter 90. If voltage converter 90 does not exist, modifying how the inverters are controlled allows variation in torque to be reduced/prevented.

With reference to FIG. 11, vehicle 1A includes electric power storage device 70 serving as a main power supply device, a motor drive unit 75A, smoothing capacitor C1, motor generators MG1 and MG2, EHC power supply 100, and an ECU 150A.

Motor drive unit 75 includes smoothing capacitor CH, inverters 60-1 and 60-2, and voltage sensor 13.

When ECU 150A changes a state of EHC power supply 100, ECU 150A previously controls motor drive unit 75A to have a state hardly causing variation in torque.

Among the inverter control systems described with reference to FIG. 5, sinusoidal PWM control is the best in controllability. Accordingly, if the overmodulation PWM control system or the rectangular wave voltage control system is currently applied, it is recommendable that it be switched to the sinusoidal PWM control system to control the inverters and then the EHC be turned on/off.

Figure 12:
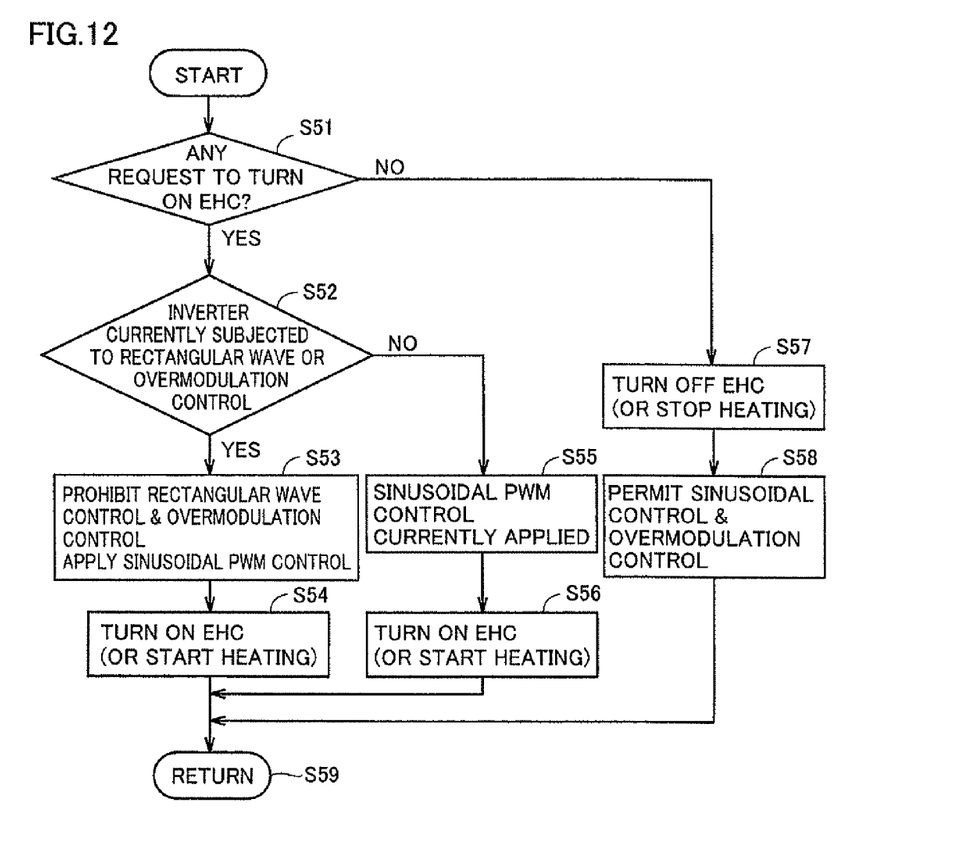
FIG. 12 is a flowchart for illustrating a control applied by an ECU 150A in the second embodiment.

FIG. 12 is a flowchart for illustrating a control applied by ECU 150A in the second embodiment. This flowchart represents a process invoked from a predetermined main routine and performed whenever a determined period of time elapses or a predetermined condition is established.

With reference to FIG. 11 and FIG. 12, the process starts, and in Step S51, ECU 150 determines from signal EHCON whether there is any request to turn on the EHC.

If in Step S51 it is determined that there is a request to turn on the EHC, the control proceeds to Step S52. In Step S52, it is determined whether inverters 60-1, 60-2 are currently subjected to rectangular wave voltage control or overmodulation PWM control. These control systems are inferior in controllability to sinusoidal PWM control, and when voltage VH varies, torque variation easily arises.

Accordingly, if it is determined in Step S52 that rectangular wave voltage control or overmodulation PWM control is currently applied, then the control proceeds to Step S53, and ECU 150A prohibits rectangular wave voltage control and overmodulation PWM control and operates inverters 60-1 and 60-2. In other words, ECU 150A extends the FIG. 7 rotational speed range A1 to rotational speed range A2, A3, and applies it, and operates inverters 60-1 and 60-2 in the sinusoidal PWM control system. This can improve the motors in controllability and minimize an effect of variation in voltage VB on controlling the motors. Thereafter in Step S54 EHC power supply 100 is activated to supply the EHC with electric power.

If it is determined in Step S52 that rectangular wave voltage control or overmodulation PWM control is currently not applied, then, as shown in Step S55, inverters 60-1 and 60-2 are currently in operation in the sinusoidal PWM control system. Accordingly this condition is held and in Step S56 EHC power supply 100 is activated to supply the EHC with electric power.

If in Step S51 it is determined that there is no request to turn on the EHC, the control proceeds to Step S57. In Step S57 the operation of EHC power supply 100 is ceased to cease supplying the EHC with electric power.

Then the control proceeds to Step S58 to permit applying rectangular wave voltage control and overmodulation PWM control to inverters 60-1, 60-2.

Once any of Steps S54, S56 and S58 has completed, the control proceeds to Step S59 to shift to the main routine.

If there is no voltage converter provided, changing the currently applied inverter control system before changing the EHC's state can reduce an effect of changing the EHC's state on controlling the motors.

Note that the second embodiment may also be modified to temporarily change an inverter control system, as has been described in the first embodiment with reference to FIG. 10. Furthermore, while a configuration having a voltage converter is employed, changing how the voltage converter should be controlled may be replaced with changing a system applied to control the inverters. Furthermore, changing how the voltage converter should be controlled and changing a system applied to control the inverters may be combined together.

Finally, reference will again be made to the drawings to summarize the present embodiments.

With reference to FIG. 1, the present embodiment provides a hybrid vehicle that includes: an engine 10; an EHC 140 configured to be electrically heatable to purify exhaust gas of engine 10; a motor MG1 or MG2 for causing the vehicle to travel; a motor drive unit 75 for driving motor MG1 or MG2; an electric power storage device 70 that supplies motor drive unit 75 with power supply voltage; an EHC power supply 100 receiving electric power from electric power storage device 70 and supplying EHC 140 with electric power to heat EHC 140; and an ECU 150 that controls motor drive unit 75 and EHC power supply 100. ECU 150 has a first control mode and a second control mode more immune to variation of power supply voltage than the first control mode as modes applied to control motor drive unit 75. If electric power supplied to EHC 140 from EHC power supply 100 is to be changed, ECU 150 previously controls motor drive unit 75 in the second control mode.

Preferably, motor drive unit 75 includes an inverter 60 for driving motor MG1 or MG2, and a voltage converter 90 provided between electric power storage device 70 and inverter 60. The first control mode includes a mode to control voltage converter 90 to provide the power supply voltage of electric power storage device 70, as it is, to inverter 60 (or a mode to control an upper arm to turn it on). The second control mode includes a mode to control voltage converter 90 to convert in voltage the power supply voltage of electric power storage device 70 and provide the converted power supply voltage to inverter 60.

As shown in FIG. 4, more preferably, voltage converter 90 includes a reactor L1 having one end connected to a positive electrode of electric power storage device 70, and an IGBT element Q1 provided between the other end of reactor L1 and a power supply node of inverter 60. ECU 150 in the first control mode fixes IGBT element Q1 in an electrically conducting state and in the second control mode switches IGBT element Q1.

As shown in FIG. 8 and FIG. 9, more preferably, if the first control mode is currently applied and concurrently a request is received to heat EHC 140, ECU 150 shifts a current mode of operation of motor drive unit 75 from the first control mode to the second control mode, and subsequently starts supplying electric power from EHC power supply 100 to EHC 140.

As shown in FIG. 8 and FIG. 9, further preferably, if the request to heat EHC 140 is no longer present, and the second control mode is currently applied, then, ECU 150 ceases supplying electric power from EHC power supply 100 to EHC 140, and subsequently shifts the mode of operation of motor drive unit 75 from the second control mode back to the first control mode.

As shown in FIG. 10, more preferably, if the first control mode is currently applied and concurrently a request is received to heat EHC 140, ECU 150 temporarily shifts a current mode of operation of motor drive unit 75 from the first control mode to the second control mode, and subsequently starts supplying electric power from EHC power supply 100 to EHC 140.

As shown in FIG. 10, further preferably, if the request to heat EHC 140 is no longer present, and the first control mode is currently applied, then, ECU 150 temporarily shifts the current mode of operation of motor drive unit 75 from the first control mode to the second control mode, and subsequently ceases supplying electric power from EHC power supply 100 to EHC 140.

As shown in FIG. 11 and FIG. 12, preferably, motor drive unit 75 includes an inverter 60 for driving the motor, and a voltage converter 90 provided between electric power storage device 70 and inverter 60. The first control mode includes a mode to apply one of rectangular wave control and overmodulation control to inverter 60. The second control mode includes a mode to apply sinusoidal pulse width modulation control to inverter 60.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST 1, 1A: hybrid vehicle; 2: wheel; 10: engine; 13, 21, 121, 121: voltage sensor; 15: U phase arm; 16: V phase arm; 17: W phase arm; 24, 25: current sensor; 40: power split device; 50: speed reducer; 60: inverter; 70: electric power storage device; 75 75A: motor drive unit; 80: driving wheel; 90: voltage converter; 100: EHC power supply; 122, 123, 124: rotational speed sensor; 125: temperature sensor; 130: exhaust path; C1, CH: smoothing capacitor; D1-D8: diode; GL0, GL1: ground line; L1: reactor; MG1, MG2: motor generator; PL0, PL1: power supply line; Q1-Q8: IGBT element.

The invention claimed is:

1. A hybrid vehicle comprising:
an internal combustion engine;
a catalytic device configured to be electrically heatable to purify exhaust gas of said internal combustion engine;
a motor for causing the vehicle to travel;
a motor drive unit for driving said motor;
a main power supply device that supplies said motor drive unit with power supply voltage;
a power supply device provided for a catalyst, and receiving electric power from said main power supply device and supplying said catalytic device with electric power to heat said catalytic device; and
a control device that controls said motor drive unit and said power supply device for the catalyst,
said control device having a first control mode and a second control mode more immune to variation of said power supply voltage than said first control mode as modes applied to control said motor drive unit;
if electric power supplied to said catalytic device from said power supply device for the catalyst is to be changed, said control device previously controlling said motor drive unit in said second control mode, wherein:
said motor drive unit includes
an inverter for driving said motor, and
a voltage converter provided between said main power supply device and said inverter;
said first control mode includes a mode to control said voltage converter to provide said power supply voltage of said main power supply device, to said inverter; and said second control mode includes a mode to control said voltage converter to convert in voltage said power supply voltage of said main power supply device and provide the converted power supply voltage to said inverter.

2. The hybrid vehicle according to claim 1, wherein:

said voltage converter includes a reactor having one end connected to a positive electrode of said main power supply device, and a switching element provided between the other end of said reactor and a power supply node of said inverter; and said control device in said first control mode fixes said switching element in an electrically conducting state and in said second control mode switches said switching element.

3. The hybrid vehicle according to claim 1, wherein when said first control mode is currently applied and concurrently a request is received to heat said catalytic device, said control device shifts a current mode of operation of said motor drive unit from said first control mode to said second control mode, and subsequently starts supplying electric power from said power supply device for the catalyst to said catalytic device.

4. The hybrid vehicle according to claim 3, wherein when said request to heat said catalytic device is no longer present, and said second control mode is currently applied, then, said control device ceases supplying electric power from said power supply device for the catalyst to said catalytic device, and subsequently shifts the mode of operation of said motor drive unit from said second control mode back to said first control mode.

5. The hybrid vehicle according to claim 1, wherein when said first control mode is currently applied and concurrently a request is received to heat said catalytic device, said control device temporarily shifts a current mode of operation of said motor drive unit from said first control mode to said second control mode, and subsequently starts supplying electric power from said power supply device for the catalyst to said catalytic device.

6. The hybrid vehicle according to claim 5, wherein when said request to heat said catalytic device is no longer present, and said first control mode is currently applied, then, said control device temporarily shifts the current mode of operation of said motor drive unit from said first control mode to said second control mode, and subsequently ceases supplying electric power from said power supply device for the catalyst to said catalytic device.

\* \* \* \* \*